United States Patent [19]

Akashi et al.

[11] Patent Number: 5,168,272
[45] Date of Patent: Dec. 1, 1992

[54] NETWORK SYSTEM FOR TRANSMITTING VEHICLE DATA

[75] Inventors: Kazuya Akashi, Tomisato; Nobumasa Misaki, Tokyo; Daisuke Manago, Hiroshima; Takao Katoh; Kimitaka Ishida, both of Tokyo, all of Japan

[73] Assignee: Fujikura Ltd., Tokyo, Japan

[21] Appl. No.: 580,949

[22] Filed: Sep. 11, 1990

[51] Int. Cl.⁵ .............................. H04Q 1/00
[52] U.S. Cl. .................... 340/825.05; 340/825.06; 307/10.1; 370/16.1; 370/17; 370/85.15; 375/107
[58] Field of Search ............ 370/16, 16.1, 15, 17, 370/85.15, 85.14; 340/825.06, 459, 825.05; 307/10.1; 375/107, 106

[56] References Cited

U.S. PATENT DOCUMENTS

| | | | |
|---|---|---|---|
| 4,189,624 | 2/1980 | Mathers | 370/85.14 |
| 4,577,313 | 3/1986 | Sy | 370/85.14 |
| 4,771,391 | 9/1988 | Blasbalg | 340/825.5 |
| 4,779,261 | 10/1988 | Yamagishi et al. | 370/16 |
| 4,809,121 | 2/1989 | Nehls | 307/10.1 |

OTHER PUBLICATIONS

Multiplex Technology: Serial Networks; SP-742; Society of Automotive Engineers, Inc.; Feb. 1988.

Primary Examiner—Donald J. Yusko
Assistant Examiner—Brian Zimmermann
Attorney, Agent, or Firm—Frishauf, Holtz, Goodman & Woodward

[57] ABSTRACT

A network system for transmitting vehicle data has a bidirectional multidrop ring in which data communication between data transmitting nodes and corresponding data receiving nodes is carried out even if a breakage or some other trouble occurs at a portion of the multidrop ring. This system ensures safe and reliable control of various vehicle loads for a long period of time. At least one multidrop bus or at least one further bidirectional multidrop ring may be electrically connected to the first-mentioned bidirectional multidrop ring, thereby widening the applicability of the system to the control of vehicle loads.

5 Claims, 4 Drawing Sheets

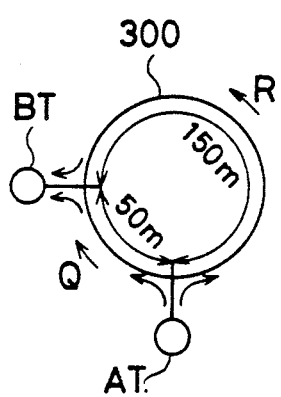
FIG.3A
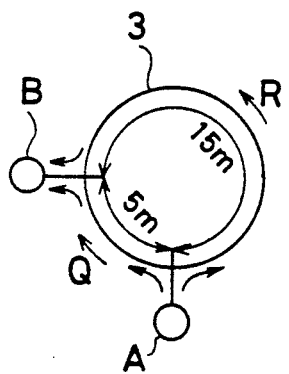
FIG.4A
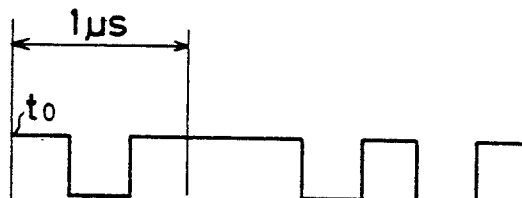
FIG.3B
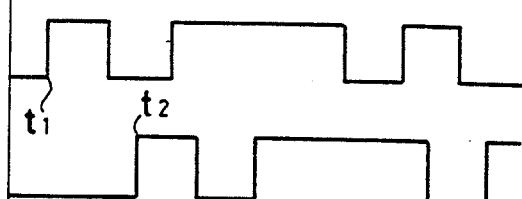
FIG.3C
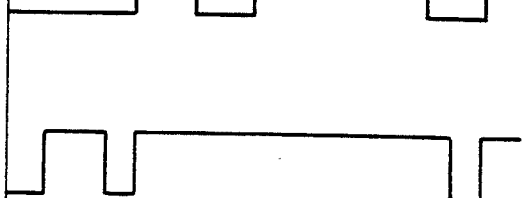
FIG.3D
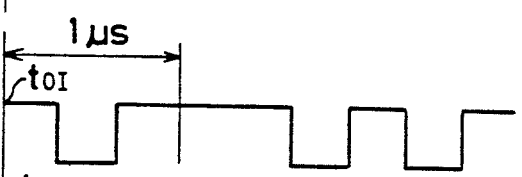
FIG.3E
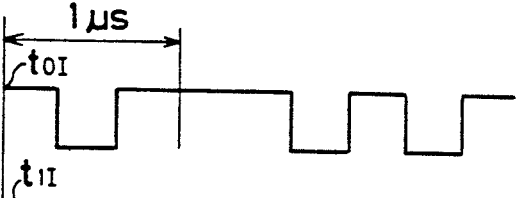
FIG.4B
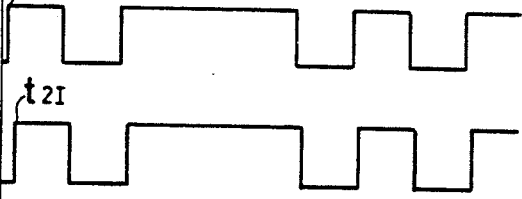
FIG.4C
FIG.4D
FIG.4E

SAMPLING TIME

SAMPLING TIME

NETWORK SYSTEM FOR TRANSMITTING VEHICLE DATA

BACKGROUND OF THE INVENTION

1. Field of the Invention

The present invention relates to a network system for transmitting vehicle data, and more particularly to an economical and reliable network system for transmitting vehicle data for controlling the operation of electrically controlled devices such as lamps and actuators.

2. Cross Reference

A diagnostic apparatus for a vehicle network system which comprises a multidrop bus connected by a plurality of nodes and having two ends connected together by a connector, and a diagnosis unit connected to both ends of the multidrop bus for diagnosing in what part of the multidrop bus trouble occurs after replacing the connector by the diagnosis unit, is disclosed in U.S. patent application Ser. No. 07/580,948 filed Sep. 11, 1990, corresponding to Japanese Patent Application No. 1-672392 filed in Japan on Mar. 24, 1989, the entire contents of which are incorporated herein by reference.

3. Description of the Related Art

As the number and the type of electronically operated devices incorporated in a vehicle have been increasing year by year, the wire harnesses for making connection between these devices have come to be ever length and the number of wires by transmitting data from switches to corresponding vehicle loads by means of a communication network such as a multidrop bus, a ring, and a star.

The article "Development of Multiple Wiring Systems in Automobile" by Tohru Uramoto and Teruhisa Inomata, Multiplex Technology: Serial Networks SP-742 published by Society of Automotive Engineering Inc. (Feb. 1988) discloses a multiplex wiring system comprising a central control unit, local control units and a transmission line for connecting the control unit with the local units. Since, however, the transmission line comprises a single wiring system, communication between the control system and at least one of the local units is interrupted if trouble such as breakage occurs in some part of the line.

Further, U.S. Pat. No. 4,771,391 discloses an adaptive packet length traffic control in a local area network system in which information received by the first node from a ring is processed therein and transmitted as new information to the next node through the ring. This information transmission process continues until the information is received by the final node and processed therein. When trouble occurs in some part of the ring, information is not transmitted to the nodes downstream of the damaged portion.

In order to overcome this drawback, a dual network system can be considered. However, a dual system has the following drawbacks:

(a) An increase in the number of wires raises the cost of the system.

(b) When dual wires are arranged along the same path. It is possible that both wires may be broken, and thus it cannot be guaranteed that their provision will increase the reliability of the network system. If, on the other hand, both wires extend along different paths, the wire arrangement becomes complicated and the wires very long. Further, the number of connectors must be increased.

(c) In such a limited area as the space between the doors and the main body of an automobile, the wires cannot be arranged in different paths. Thus, if a door is accidentally opened while the automobile is in motion, both wires are likely to be broken.

SUMMARY OF THE INVENTION

Accordingly, the object of this invention is to provide a network system for transmitting vehicle data wherein communication between all nodes of the network can be accomplished even if part of a data transmitting path is broken or some other problem occurs therein, and thus dual wiring is not required.

In order to attain this object, a network system for transmitting vehicle data according to the present invention comprises a multidrop bus having two ends electrically connected together to form a bidirectional multidrop ring along which the same vehicle data is transmitted in two opposite directions, and a plurality of nodes connected to the bidirectional multidrop ring. The bidirectional multidrop ring has such a circumferential length that when one of the vehicle data is transmitted i n the two directions from one of the nodes which is in a data-transmitting state to another node which is in a data-receiving state, said one of the data transmitted in one of the two directions and arriving at said another node later than the same data transmitted in the other direction arrives at said another node during a time interval from the beginning of a bit of said one of the vehicle data which was transmitted in the other direction to a sampling time thereof.

According to the present invention, data transmitted from any data transmitting nodes to any corresponding data receiving nodes is transmitted in two opposite directions along a bidirectional multidrop ring, thereby ensuring the data transmission between any required nodes even if a portion of a transmitting path is broken or some other problem including disconnection of a connector occurs, without the need to use a dual network.

Further, since the circumferential length of the bidirectional multidrop ring is as above-mentioned, the composite waveform, at the data receiving node, of the data transmitted in the two directions is substantially the same as the waveform generated at the data transmitting node.

The network system according to the present invention has a degree of safety and reliability similar to or higher than the network system having a dual-structured multidrop bus or a dual-structured ring. In addition, the usage of fewer wires and connectors renders the network light in weight and low in cost.

BRIEF DESCRIPTION OF THE DRAWINGS

The present invention will be fully described by way of embodiments with reference to the accompanying drawings in which:

FIG. 3A is a simplified schematic view of a network system used for a telecommunication system;

FIGS. 3B to 3E are time charts of the network system of FIG. 3A;

FIG. 4A is a simplified schematic view of the network system of FIG. 1;

FIGS. 4B to 4E are time charts of the network system of FIG. 4A;

DESCRIPTION OF THE PREFERRED EMBODIMENTS

Figure 1:
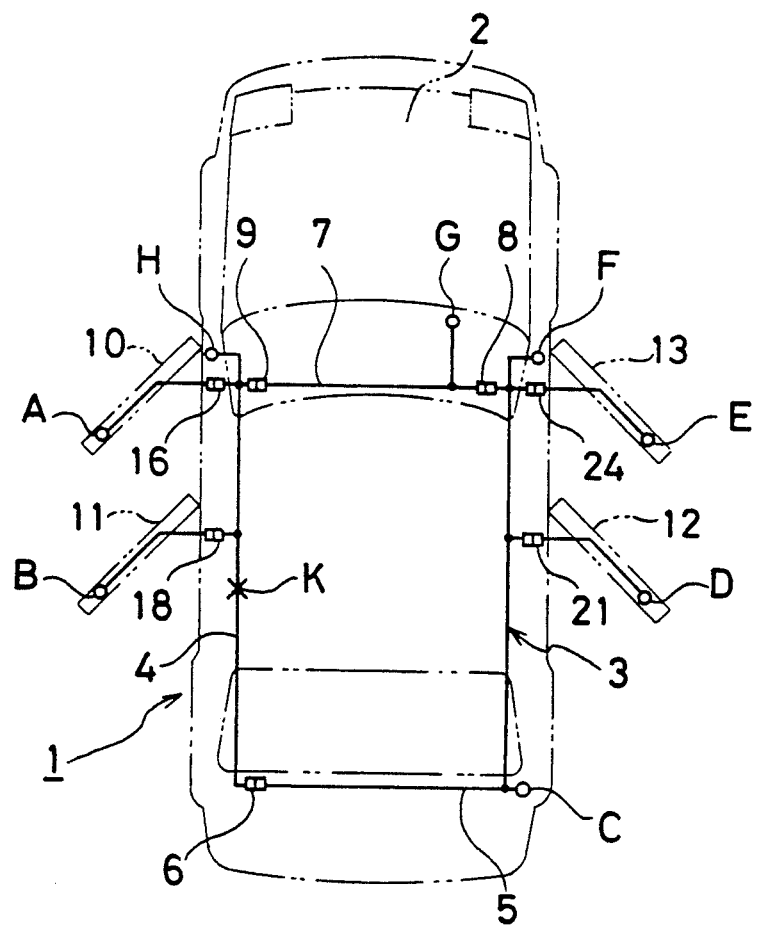
FIG. 1 is an embodiment, applied to an automobile, of a network system for transmitting vehicle data according to the present invention.

As shown in FIG. 1, a network system 1 for transmitting vehicle data, which is applied to an automobile 2, comprises a bidirectional multidrop bus 3 and nodes, A, B, C, D, E, F, G and H (and, if necessary, other additional nodes) electrically connected to the bus 3.

The multidrop bus 3 comprises a wire 4, a wire 5 connected to the wire 4 by means of a connector 6, a wire 7 connected to the wires 4 and 5 by means of connectors 8 and 9, respectively such that the bus 3 forms a ring.

for example, the nodes A, B, D and E are connected to power door lock motors of doors 10 to 13 of the automobile 2, the node H to a wiper motor and the node C, F and G to lamps. The node A is connected to the wire 4 by means of a connector 16, the node B to the wire 4 by means of a connector 18, the node C to the wire 5, the node D to the wire 5 by means of a connector 21, the node E to the wire 5 by means of a connector 24, the node F to the wire 5, and the node G to the wire 7.

Figure 2:
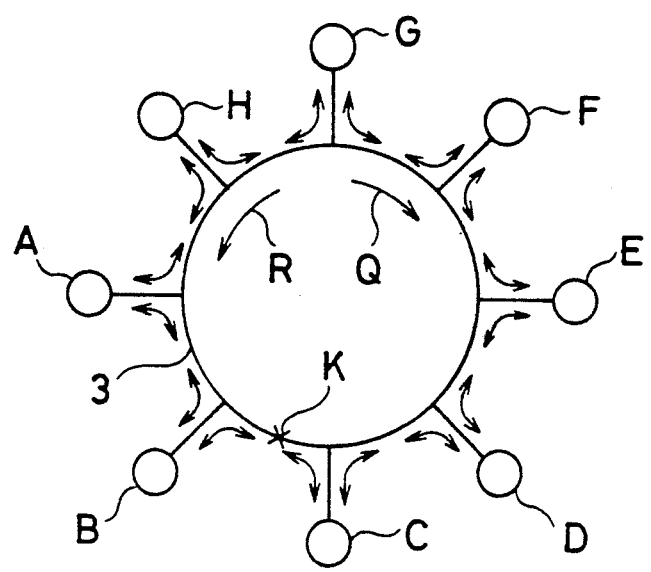
FIG. 2 is a schematic view of the network system of FIG. 1.

Referring to FIG. 2, which shows a simplified form of the network system of FIG. 1, data from any node is transmitted in both opposite directions Q and R along the bus 3. When there is no breakage or other problem with the bus 3, data between the data transmitting nodes and the corresponding data receiving nodes are transmitted in both directions Q and R.

Where, on the other hand, a breakage or other trouble occurs at, for example, a portion K between the nodes B and C, the directions of the data transmission are limited. Inquiry data transmitted from the node A to the node H and from the node B to the node C is transmitted only in the clockwise direction Q, and response data from the node H to the node A and from the node C to the node B is transmitted only in the counterclockwise direction R, whereas, inquiry data from the node D to the node G and from the node E to the node F is transmitted only in the counterclockwise direction R, and response data from the node G to the node D and from the node F to the node E is transmitted only in the clockwise direction Q.

In any event, however, data communication between the data transmitting nodes and the corresponding data receiving nodes is carried out without fail.

This data communication is always performed even if a breakage or some other trouble occurs at some part of the bus 3, or if any one of the connectors 6, 8 and 9 is disconnected, thereby ensuring correct operation of the nodes A to H of the network system 1, although the system 1 will become out of order if a breakage or some other trouble occurs at two or more locations between different adjacent nodes.

It will now be explained why a bidirectional multidrop ring 3 is used in the network system according to the present invention.

First, let is be assumed that a bidirectional multidrop ring 30 is used in a long-distance telecommunication network system which usually has a data transmitting path of some hundred meters at the shortest.

FIG. 3A shows a schematic view of a long-distance telecommunication network 300 having a data transmitting path of 200 meters. It is assumed that a node BT is separated from an node AT by 50 meters in the clockwise direction Q along the network 300 and by 150 meters in the counterclockwise direction R therealong.

FIG. 3B shows pulse signals generated at the node AT at which a bit starts at time $t_0$. FIGS. 3C and 3D show pulse signals traveling in both the directions Q and R and arriving at the node BT at times $t_1$ and $t_2$, respectively. Since, as shown in FIG. 3C, and 3D, the time $t_2$ is much delayed from the time $t_1$, the composite signal appearing in the node BT in FIG. 3E exhibits a waveform quite different from that of the bit in FIG. 3B. In other words, the waveform of the signals generated by the node AT is very different from that of the resultant signals in the node BT, such that the data receiving nodes read erroneous data. In this respect, the bidirectional multidrop ring cannot be used in the long-distance telecommunication network.

However, if a network is very short, for example, some ten meters (preferably, 40 meters at most) such as in the case of a network system for transmitting vehicle data, a bidirectional multidrop ring is applicable thereto.

FIG. 4A shows a schematic view of the multidrop ring 3 as described above and having a circumferential length of 20 meters, which is one tenth the length of the telecommunication network 300 in FIG. 3A. It is assumed that the node B is separated from the node A by 5 meters in the clockwise direction Q along the bus 3 and 15 meters in the counterclockwise direction R therealong.

FIG. 4B shows pulse signals generated at the node A at which a bit starts at time $t_{0f}$. FIG. 4C and 4D show pulse signals traveling in both directions Q and R and arriving at the node B at times $T_{f1f}$ and $t_{2f}$, respectively. As the time $t_{2f}$ is much closer to the time $t_{11}$, the composite signal shown in FIG. 4E has substantially the same waveform as that of the bit in FIG. 4B.

As a result, the node B receives substantially the same data from the node A at substantially the same time, whereby the device connected to the node B is accurately operated in response to the command from the node A. Response data is similarly transmitted from the node B to the node A, so that an accurate response is made.

Next, the condition under which the waveform of the composite signals or data in the node B is rendered identical to that of the signals or data generated at the node A will now be explained with reference to FIGS. 5 and 6.

Figure 5:
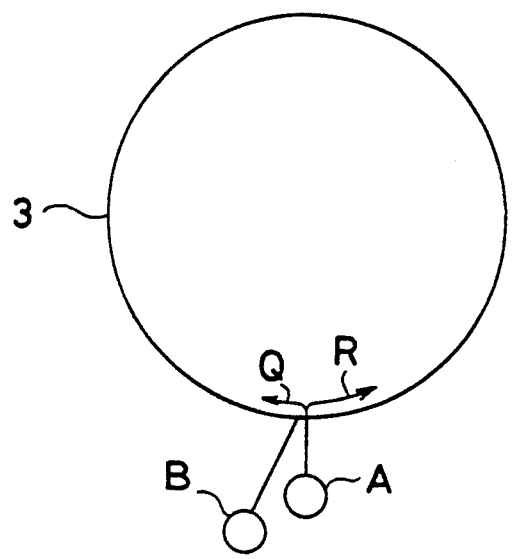
FIG. 5 is a schematic view illustrating the transmission of vehicle data from the node A to the node B in two opposite directions.

In FIG. 5, let it be assumed that the bidirectional multidrop ring 3 has a circumferential length (that is, the length of the transmitting path) of L and the node B is disposed very close to the node A in the clockwise direction Q; that is, the distance between both the nodes A and B measured in the direction Q is substantially zero, the propagation speed and the transmission speed of data in the bus 3 are m/sec and f bits/sec, respectively.

Figure 6:
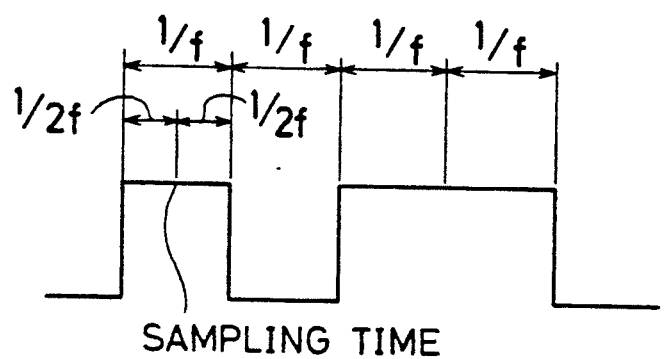
FIG. 6 is the time chart at the node B of FIG. 5, in which data transmitted from the node A is sampled at the center of each bit of the data.
Figure 7:
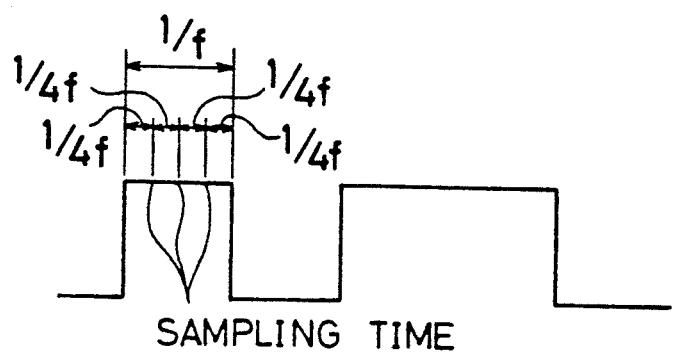
FIG. 7 is the time chart at the node B of FIG. 5, in which data transmitted from the node A is sampled at every quarter of the period of each bit of the data.

When the node B is set as shown in FIG. 6 so that data from the node A is sampled at the center of each bit of the data, the allowed time difference t (in seconds) between the time when data transmitted from the node A to the node B in one of both directions Q and R arrives at the node B and the time when the same data transmitted from the node A to the node B in the other direction arrives at the node B (that is, the time required for data to travel a length L in the bus 3 in this case) is given by $$t = L/c < 1/(2f):$$

alternatively, the circumferential length is defined by $$L < c/(2f).$$

Upon setting the node B so as to sample the data from the node A at every quarter of a period of each bit of the data, the allowed time difference t in seconds is defined by $$t = L/c < 1/(4f):$$

alternatively, the circumferential length is defined by $$L < c/(4f).$$

If the sampling is carried out at every one-n'th of a period of each bit, then the allowed time difference in seconds is determined by $$t = L/c < 1/(nf).$$

Or the circumferential length is defined by $$L < c/(nf).$$

Since the propagation speed is changes depending upon the type of bus medium and the type of insulation material of the bus, the allowed time difference must be selected accordingly, Further, there are differences between the clock frequencies of the nodes A to H. Thus, margins for these clock differences must be taken into account.

Generally, when data is transmitted from a data transmitting node to a corresponding data receiving node in both directions Q and R, the data traveling in one direction and arriving at the data receiving node later than the same data traveling in the other direction must arrive at the data receivig node during the time interval from the beginning of a bit of the earlier arriving same data to the sampling time in the bit, such that the waveform of the data in the receiving mode is substantially identical to that of the data in the data transmitting node. In other words, the allowed time difference is defined as the time difference between the time of the later arriving data and the earlier data at a data receiving node within the time interval from the beginning of a bit of the earlier arriving data to the sampling time of the In Table 1, comparison is made between conventional network systems having a single multidrop bus, a single ring, a dual multidrop bus and a dual ring and a network system having a multidrop ring according to the present invention, when they are all applied to an automobile control as shown in FIG 1.

TABLE 1

| | length of network (m) | number of connectors |
|---|---|---|
| single multidrop bus | 14 | 6 |
| single ring | 24 | 7 |
| dual multidrop bus | 27 | 12 |
| dual ring | 47 | 14 |
| multidrop ring (invention) | 16 | 7 |

From Table 1, it can be seen that the network system using a multidrop ring according to the present invention has the advantages of having a shorter network and fewer connectors than the conventional one, with the exception of that using a single multidrop bus, which, however, is less reliable than the present invention.

Figure 8:
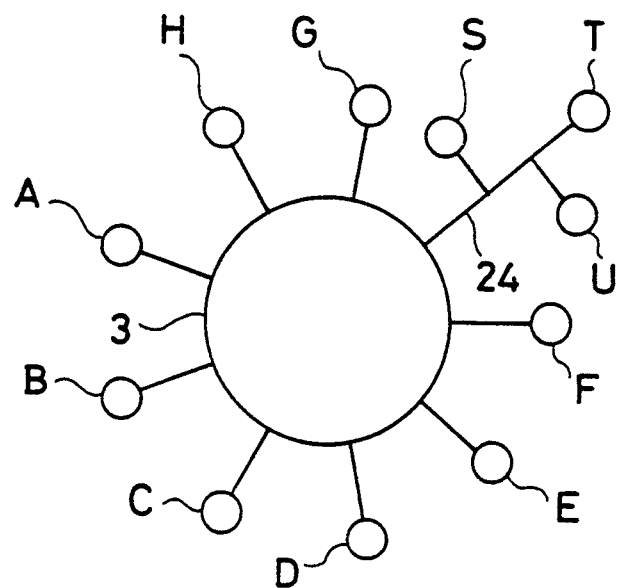
FIG. 8 is another embodiment of a network system according to the present invention.

FIG. 8 shows another embodiment of the network system according to the present invention, in which a multidrop bus 24 is connected to the bidirectional multidrop ring 3 of the first embodiment, so that devices associated with nodes S, T and U (if necessary, other nodes), connected to the multidrop bus 24 can be controlled by the nodes of the bidirectional multidrop ring 3. Two or more multidrop buses can be connected to the multidrop ring 3.

Figure 9:
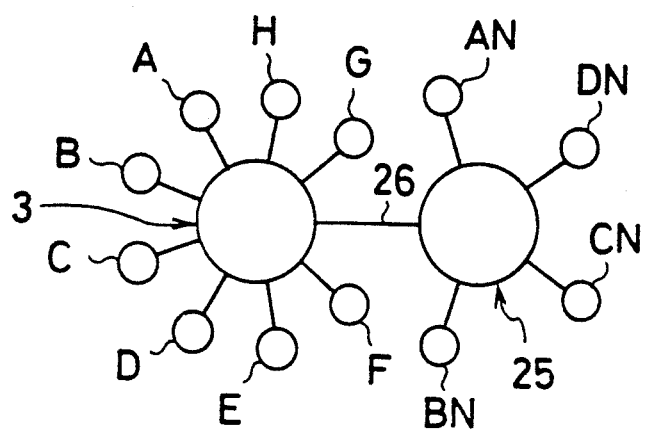
FIG. 9 is a further embodiment of a network system according to the present invention.

Shown in FIG. 9 is a further embodiment of the network according to the present invention, wherein a further bidirectional multidrop ring 25 having nodes AN, BN, CN and DN (if necessary, other nodes) connected to associated devices is electrically connected by means of a lead 26 to the bidirectional multidrop ring 3 of the first embodiment. This system allows for communication between both multidrop rings 3 and 25, to control a wide variety of devices. The connection of two or more further multidrop rings to the multidrop ring 3 is also possible.

It should be noted that the present invention is applicable to the control of a vehicle other than an automobile.

What is claimed is:

1. A network system for transmitting vehicle data comprising:
    a multidrop bus having two ends electrically connected together to form a bidirectional multidrop ring along which a same vehicle data is transmitted in a first direction and a second direction opposite to said first direction; and
    a plurality of nodes connected to the bidirectional multidrop ring, said nodes each including means for sampling data at given sampling times;
    said bidirectional multidrop ring having a circumferential length such that, when said same vehicle data is transmitted in said first and second opposite directions from one of said nodes which is in a data-transmitting state to another of said nodes which is in a data-receiving state, said same vehicle data transmitted in the first direction and arriving at said another of said nodes later than the same vehicle data transmitted in the second direction, arrives at said another of said nodes during a time interval, measured at said another of said nodes, starting from the beginning of a bit of said same vehicle data which was transmitted in said second direction to a sampling time of said bit at said another of said nodes, said time interval being a function of the sampling time.

2. The network system according to claim 1, wherein said circumferential length of said bidirectional multidrop ring is defined by $$L < c/(nf)$$

where L is said circumferential length of said bidirectional multidrop ring in meters c is a propagation speed of said vehicle data expressed in m/sec and transmitted in said bidirectional multidrop ring, n is a number of samplings per a period of said bit, and f is a transmitting speed, in bits per second, of said vehicle data in said bidirectional multdrop ring.

3. The network system according to claim 1, wherein said circumferential length of said bidirectional multidrop ring is at most 40 meters.

4. The network system according to claim 1, further comprising at least one multidrop bus electrically connected to said bidirectional multidrop ring.

5. The network system according to claim 4, wherein said at least one multidrop bus comprise a further multidrop ring.

* * * * *